(12) United States Patent
Weiß

(10) Patent No.: US 10,697,359 B2
(45) Date of Patent: Jun. 30, 2020

(54) SUPERCHARGED INTERNAL COMBUSTION ENGINE

(71) Applicant: MAN Truck & Bus AG, München (DE)

(72) Inventor: Joachim Weiß, Oberasbach (DE)

(73) Assignee: MAN TRUCK & BUS AG, München (DE)

(*) Notice: Subject to any disclaimer, the term of this patent is extended or adjusted under 35 U.S.C. 154(b) by 82 days.

(21) Appl. No.: 16/016,173

(22) Filed: Jun. 22, 2018

(65) Prior Publication Data

US 2019/0003374 A1 Jan. 3, 2019

(30) Foreign Application Priority Data

Jun. 30, 2017 (DE) .................. 10 2017 114 723

(51) Int. Cl.
*F02B 37/14* (2006.01)
*F02B 37/10* (2006.01)
(Continued)

(52) U.S. Cl.
CPC .............. *F02B 37/14* (2013.01); *B60K 6/485* (2013.01); *B60W 10/06* (2013.01); *B60W 10/08* (2013.01); *B60W 20/10* (2013.01); *B60W 30/1882* (2013.01); *F01N 5/04* (2013.01); *F02B 37/005* (2013.01); *F02B 37/10* (2013.01); *F02B 37/18* (2013.01); *F02B 39/10* (2013.01);
(Continued)

(58) Field of Classification Search
CPC .......... F02B 37/14; F02B 39/10; F02B 37/18; F02B 37/005; F02B 37/10; B60W 20/10; B60W 10/06; B60W 10/08; B60W 30/1882; B60K 6/485; F01N 5/04; F01N 2590/11; F02D 13/0269; F02D 41/0007; F02D 23/02; H02K 11/0094; H02K 7/1823; F02C 6/14; F02C 5/00; F05D 2270/07; F05D 2220/60; F05D 2220/40
USPC ........................................ 60/602, 605.1, 611
See application file for complete search history.

(56) References Cited

U.S. PATENT DOCUMENTS 6,637,205 B1 * 10/2003 Ahmad .................... F02B 37/04
60/607
7,640,745 B2 * 1/2010 Japikse ................. F01D 13/003
60/605.1

(Continued)

FOREIGN PATENT DOCUMENTS

DE 102007022145 A1 1/2008
DE 102007039458 A1 4/2008
(Continued)

*Primary Examiner* — Hoang M Nguyen
(74) *Attorney, Agent, or Firm* — Weber Rosselli & Cannon LLP

(57) ABSTRACT

An internal combustion engine is described. The internal combustion engine comprises a valve control which is configured to close inlet valves of the internal combustion engine at Miller or Atkinson closing times. An electrified exhaust-gas turbocharger of the internal combustion engine comprises an electric machine which is operable selectively as a motor or generator. A control unit operates the electric machine of the electrified exhaust-gas turbocharger as a motor in a first load range of the internal combustion engine and as a generator in a second load range which corresponds to greater loads of the internal combustion engine than the first load range.

15 Claims, 3 Drawing Sheets

(51) Int. Cl.

| | | |
|---|---|---|
| *F02B 37/18* | (2006.01) | |
| *F02D 41/00* | (2006.01) | |
| *F02D 13/02* | (2006.01) | |
| *F01N 5/04* | (2006.01) | |
| *B60K 6/485* | (2007.10) | |
| *B60W 30/188* | (2012.01) | |
| *B60W 10/08* | (2006.01) | |
| *B60W 10/06* | (2006.01) | |
| *B60W 20/10* | (2016.01) | |
| *F02B 39/10* | (2006.01) | |
| *F02B 37/00* | (2006.01) | |
| *F02C 5/00* | (2006.01) | |
| *F02C 6/14* | (2006.01) | |
| *H02K 7/18* | (2006.01) | |
| *H02K 11/00* | (2016.01) | |
| *F02D 23/02* | (2006.01) | |

(52) U.S. Cl.
CPC ............... *F02C 5/00* (2013.01); *F02C 6/14* (2013.01); *F02D 13/0269* (2013.01); *F02D 41/0007* (2013.01); *H02K 7/1823* (2013.01); *H02K 11/0094* (2013.01); *F01N 2590/11* (2013.01); *F02D 23/02* (2013.01); *F05D 2220/40* (2013.01); *F05D 2220/60* (2013.01); *F05D 2270/07* (2013.01)

(56) References Cited

U.S. PATENT DOCUMENTS

| | | | |
|---|---|---|---|
| 9,038,383 B2* | 5/2015 | Jacobson | F02B 39/06 475/267 |
| 2006/0236692 A1* | 10/2006 | Kolavennu | F01N 3/0807 60/602 |
| 2006/0260305 A1* | 11/2006 | Ishiwatari | F02B 37/10 60/599 |
| 2007/0144175 A1 | 6/2007 | Sopko et al. | |
| 2013/0096758 A1* | 4/2013 | Yuille | B60W 10/06 701/22 |
| 2016/0195047 A1 | 7/2016 | Carter et al. | |

FOREIGN PATENT DOCUMENTS

| | | |
|---|---|---|
| EP | 0945606 A2 | 9/1999 |
| WO | 0121939 A2 | 3/2001 |
| WO | 2008079180 A1 | 7/2008 |

* cited by examiner

SUPERCHARGED INTERNAL COMBUSTION ENGINE

BACKGROUND

The present disclosure relates to an internal combustion engine, for example for driving a vehicle. In particular, an internal combustion engine with Miller or Atkinson closing times is described.

Only a few years after the basic disclosures relating to the four-stroke principle by A. E. Beau de Rochas and N. A. Otto, closing times of the inlet valve that deviate greatly from bottom dead centre (BDC) were implemented in order that, as a result of a longer expansion stroke compared with compression, the combustion gas expands further, cools more greatly and thus the energy contained in the gas is exploited better. In particular, it has been known for a long time that, as a result of very early closing (before BDC) or very late closing (for example more than 40° after BDC) of the inlet valve according to R. Miller or according to J. Atkinson, high specific loads (i.e. the mechanical power output in relation to the fuel rate) with lower peak pressures (i.e. the maximum of the cylinder pressure in the cycle after top dead centre of firing) than in conventional control timing can be achieved. Provided that the supercharging system has good efficiency levels, it is also possible for the specific fuel consumption (i.e. the reciprocal of the specific load) to be lowered here. At the same time, lower nitrogen oxide emissions arise on account of lower process temperatures.

These advantages can be found especially in the range of high levels of power. In the range of average and lower levels of power, the drawbacks resulting from the lower volumetric efficiencies predominate, which are not yet compensated by efficient supercharging. Generally, Miller or Atkinson control timing is therefore applied in combination with a variable valve drive, which allows the control timing to be switched or changed between the power ranges. The document WO 2001/21939 A2 describes a hydraulic mechanism for operating a valve of an internal combustion engine, said hydraulic mechanism allowing a Miller cycle under partial load and allowing the Miller cycle to be deactivated under full load. The document DE 10 2007 022 145 A1 describes a switchable valve drive of an internal combustion engine with an axially displaceable cam on the camshaft.

However, such switchable valve drives are associated with complicated control mechanics, which increase the production costs of the internal combustion engine, increase the installation space therefor and/or reduce the reliability of the internal combustion engine.

SUMMARY

Therefore, the object of the present disclosure is to specify an internal combustion engine which makes it possible to exploit the advantages of inlet valves that close away from BDC even without a switchable valve drive.

According to one aspect of the disclosure, an internal combustion engine is provided. The internal combustion engine comprises a valve controller which is configured to close inlet valves of the internal combustion engine at Miller or Atkinson closing times. The internal combustion engine also comprises an electrified exhaust-gas turbocharger having an electric machine which is operable selectively as a motor or generator. The internal combustion engine also comprises a control unit which is configured to operate the electric machine of the electrified exhaust-gas turbocharger (for example at times) as a motor in a first load range of the internal combustion engine and to operate same (for example at times) as a generator in a second load range which corresponds to greater loads of the internal combustion engine than the first load range.

Operation as a generator in the second load range can occur at times. Transitional operation as a motor can also take place in the second load range.

In this case, the load can be determined by the mechanical power and/or the torque of the internal combustion engine (for example at a crankshaft of the internal combustion engine). In particular, the first and second load ranges can also be referred to as first and second power range, respectively. In this case, "load" and "torque" can be understood as being analogous or interchangeable terms. Furthermore, since the "power" is proportional to the product of engine speed and torque, the term "power" can also be correlated clearly with the "torque", for example in that a typical or average engine speed is used to distinguish in principle between the operating states of the engine. The load can relate to the internal combustion engine without the contribution of any electric machine that may also act on the crankshaft.

The internal combustion engine can be a combustion motor, in particular a reciprocating-piston engine. The internal combustion engine can be a four-stroke engine, in particular a spark-ignition engine or a diesel engine.

The internal combustion engine can be embodied without exhaust-gas recirculation (EGR). For example, EGR can be avoided on account of the closing times of the valve controller of the internal combustion engine.

The control unit can furthermore be configured to mechanically decouple the electric machine of the electrified exhaust-gas turbocharger in the first and/or second load range and/or to operate same in a deenergized state (i.e. in an electrically functionless manner, neither as a generator nor as a motor) therein. The control unit can operate the electric machine of the electrified exhaust-gas turbocharger at times and/or predominantly as a motor in the first load range of the internal combustion engine. Alternatively or additionally, the control unit can operate the electric machine of the electrified exhaust-gas turbocharger at times and/or predominantly as a generator in the second load range.

The control unit can be configured not to operate the electric machine of the electrified exhaust-gas turbocharger as a generator in the first load range. The control unit can be configured to operate the electric machine of the electrified exhaust-gas turbocharger as a motor only in the first load range. Alternatively or in combination, the control unit can be configured to operate the electric machine of the electrified exhaust-gas turbocharger as a generator only in the second load range.

Furthermore, the control unit can be configured to employ the electric machine of the electrified exhaust-gas turbocharger neither as a motor nor as a generator in the first load range. For example, the control unit can temporarily cause the electrified exhaust-gas turbocharger to operate as a motor in the second load range in order to avoid a turbo lag (i.e. when the internal combustion engine is intended to output a high torque but cannot do so yet because insufficient combustion air is present).

The exhaust-gas turbocharger can comprise a compressor for generating a charge pressure of the internal combustion engine, and a turbine driving the compressor. The inlet valves of the internal combustion engine can be fluidically connected to the compressor of the exhaust-gas turbocharger via a charge-air cooler. The turbine and/or the compressor can be designed to generate a charge pressure that compensates a charging volume, reduced with respect to the displacement on account of the closing times, in the first load range of the internal combustion engine.

Compensation can in this case include overcompensation, for example when the electric machine of the exhaust-gas turbocharger is operated as a motor. The charge pressure of the exhaust-gas turbocharger in the first load range and the charging volume reduced on account of the closing times can correspond to an air mass which is the same as or greater than an air mass that corresponds to the ambient pressure (for example normal pressure) and the displacement of the internal combustion engine, for example in each case at the same temperature.

For example, the exhaust-gas turbocharger can be dimensioned such that the charge pressure in the first load range compensates a reduction in the volumetric efficiency on account of the closing times. A turbine cross section of the turbine can be dimensioned and/or a turbine geometry of the turbine can be shaped such that the exhaust-gas turbocharger compensates the charging volume, reduced by the closing times, by the charge pressure in the first load range. The exhaust-gas turbocharger can be configured (for example as regards the turbine geometry and/or the turbine cross section) to compensate the charging volume, reduced on account of the switching times, by the charge pressure in the first load range in a manner driven by the exhaust-gas flow (for example the exhaust-gas pressure of the exhaust-gas flow of the internal combustion engine). The exhaust-gas turbocharger can be configured to compensate the charging volume, reduced on account of the switching times, by the charge pressure only by the exhaust-gas flow and/or without the electric machine of the exhaust-gas turbocharger being operated as a motor at high loads within the first load range or at the transition from the first load range to the second.

The turbine, in particular the turbine cross section and/or the turbine geometry, can be the same in the first load range and in the second load range. The turbine, in particular the turbine cross section and/or the turbine geometry, can be invariable.

The control unit can be configured to convert a mechanical power of the turbine, which goes beyond the power required by the compressor for compensation, by means of the electric machine operated as a generator, in the second load range. The electric machine operated as a generator in the second load range can convert at least a part of the power not required by the compressor. The necessary turbine power can be the power that is required in stationary operation of the internal combustion engine in order to generate the charge pressure with which the combustion air ratio required at each particular operating point can be realized. The power output of the turbine that goes beyond this necessary turbine power can be fed as excess power to the electric machine operated as a generator.

The electric machine of the exhaust-gas turbocharger can be rigidly coupled to the turbine and/or the compressor of the exhaust-gas turbocharger. The control unit can also be configured to decouple the electric machine of the exhaust-gas turbocharger from a common shaft (of the turbine and of the compressor) in the first load range, for example in order to reduce losses on the part of the power electronics.

The closing times of the valve controller can be invariable. For example, it is possible for the internal combustion engine not to comprise a variable valve controller. The closing times and/or the valve control can be the same in the first load range and in the second load range.

The closing times can be determined relative to the cycle of the internal combustion engine (for example to the rotational position of the camshaft and/or a state in the clockwise thermodynamic cycle).

The valve controller can comprise a camshaft driven by a crankshaft of the internal combustion engine, said camshaft determining the closing times. The camshaft can set the closing times in a uniform manner for the entire load range of the internal combustion engine. Camshaft adjustment can be avoided.

The internal combustion engine can also comprise a rechargeable electrical energy store which is connected or connectable to the electric machine of the electrified exhaust-gas turbocharger in order to store the electrical energy output during operation as a generator. The electric machine of the electrified exhaust-gas turbocharger and the rechargeable energy store can be connected via a DC voltage network, for example a 48-volt network.

The internal combustion engine can also comprise a second electric machine, which is configured as a power machine in order to convert electrical energy output by the electrified exhaust-gas turbocharger in the second power range. The second electric machine can be rigidly connected to the crankshaft of the internal combustion engine. For example, the second electric machine can be realized by a crankshaft starter generator. The internal combustion engine can be a hybrid drive or a constituent of a hybrid drive.

The control unit can also be configured to connect the second electric machine to the electric machine, operated as a generator, of the electrified exhaust-gas turbocharger for power supply by said electric machine. The second electric machine can be fed directly by the electric machine, operated as a generator, of the electrified exhaust-gas turbocharger. Alternatively or in combination, the second electric machine can be supplied with electric power by the electrical energy store. The second electric machine can be connected or connectable to the electrical energy store for power supply.

In order to recover kinetic energy (for example kinetic energy of a motor vehicle), the second electric machine can also be operated selectively as a generator. The electrical energy store can be connected or connectable to the second electric machine in order to store kinetic energy recovered by means of the second electric machine.

A wastegate can be arranged in the exhaust-gas flow of the internal combustion engine. The wastegate can comprise a bypass valve for bypassing the turbine of the electrified exhaust-gas turbocharger.

The control unit can also be configured to open the wastegate in a part of the second load range which corresponds to higher loads within the second load range. The control unit can open the wastegate to such an extent that the power converted by the electric machine of the exhaust-gas turbocharger when operated as a generator corresponds to a predetermined highest power.

According to a further aspect, a vehicle, for example a land vehicle or a watercraft, is provided, which comprises an internal combustion engine according to one embodiment of the device aspect. The land vehicle can be a passenger car, a commercial vehicle (for example a bus, a truck, a tractor unit or an agricultural machine).

BRIEF DESCRIPTION OF THE DRAWINGS

Further features and advantages of the disclosure are described in the following text with reference to the appended drawings, in which.

DETAILED DESCRIPTION

Figure 1:
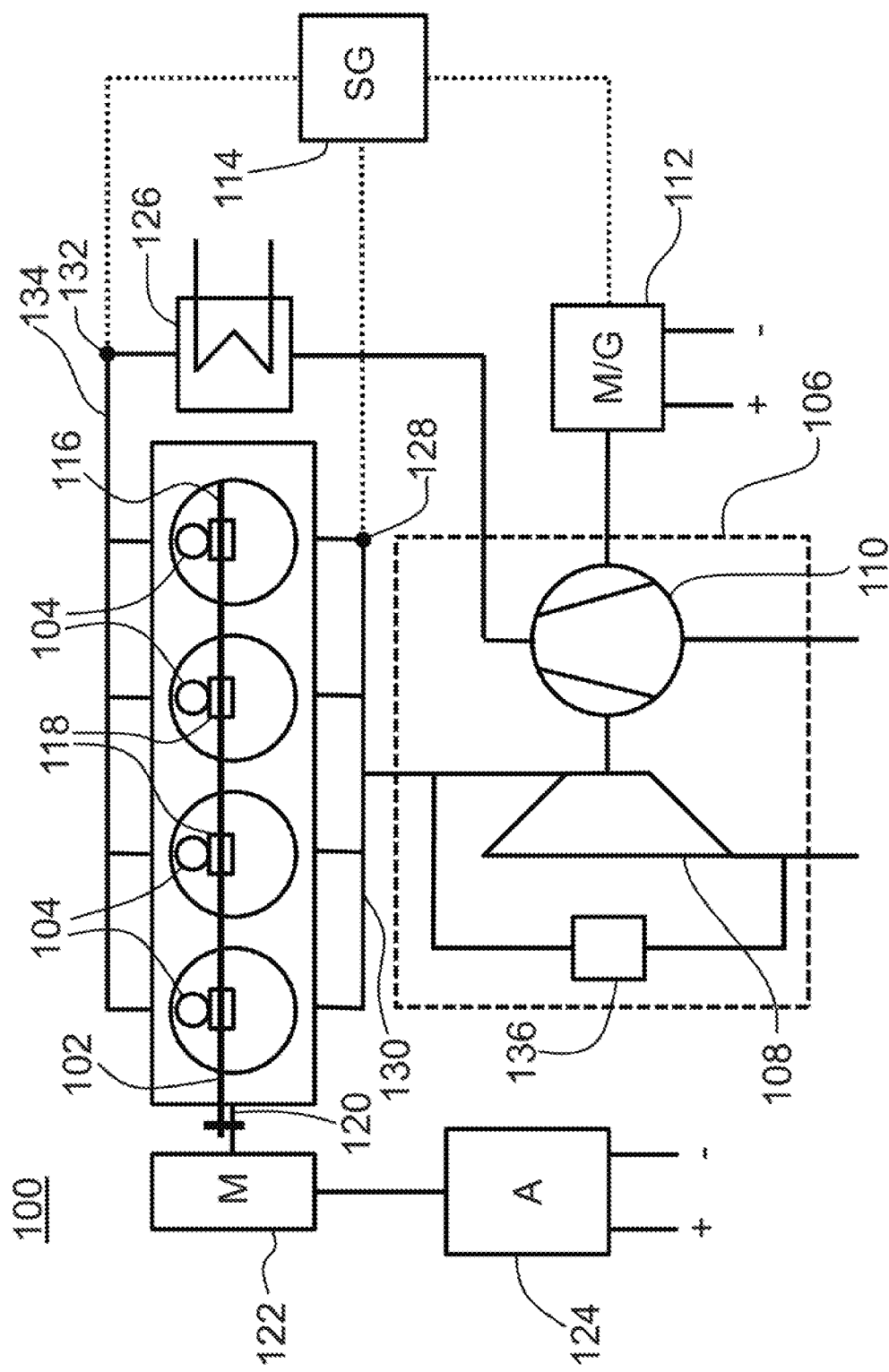
FIG. 1 shows a schematic block diagram of one exemplary embodiment of the internal combustion engine.

FIG. 1 shows a schematic block diagram of one exemplary embodiment of an internal combustion engine that is denoted overall by the reference sign 100. The internal combustion engine 100 comprises a valve controller 102, which closes at least inlet valves 104 of the internal combustion engine 100 away from BDC, in particular at Miller or Atkinson closing times. Furthermore, the internal combustion engine 100 comprises an electrified exhaust-gas turbocharger 106 with a turbine 108, a compressor 110 and an electric machine 112. The electric machine 112 of the electrified exhaust-gas turbocharger 106 is operable selectively as a motor or as a generator, for which reason it can also be referred to as an electric motor-generator unit. Furthermore, the internal combustion engine 100 comprises a control unit 114 for controlling the operation of the electric machine 112 of the electrified exhaust-gas turbocharger 106.

According to the control unit 114, in a first load range of the internal combustion engine 100, the electric machine 112 is operated at least at times as a motor. For example, the electric machine 112 can be operated with a variable motor power in the first load range. If electromotive support for the drive of the compressor 110 by the turbine 108 is not necessary, the electric machine 112 can be mechanically and/or electrically decoupled. In a second load range, which comprises greater loads of the internal combustion engine 100 than the first load range, the electric machine 112 is operated at least at times as a generator.

The closing times set by the valve controller 102, for example a camshaft 116 with fixed cams 118, are invariable over the load ranges. The valve controller 102 and the inlet valves are also referred to as an inlet system. The cross section of the exhaust-gas turbine 108 is dimensioned such that sufficient air supply to the internal combustion engine 100 is ensured in the first load range (for example at low to average levels of power of the internal combustion engine 100) without electrical support by the electric machine 112. In the second load range, the exhaust-gas pressure would rise greatly before the inlet into the turbines 108 (for example at higher levels of power) on account of the narrow cross section (for example relative to the exhaust-gas flow of the internal combustion engine 100) of the exhaust-gas turbine 108. This is counteracted by the electric machine 112 of the electrified exhaust-gas turbocharger 106 being operated as a generator. In particular, excess mechanical energy of the exhaust-gas turbine 108 is converted into electrical energy by the electric machine 112 during operation as a generator.

To this end, the internal combustion engine 100 can comprise an electrical energy store 124 and/or a second electric machine 122. The second electric machine 122 is connected on the output side to the internal combustion engine 100, for example to a crankshaft 120 of the internal combustion engine 100. The excess energy of the exhaust-gas turbine 108 is fed to the electrical energy store 124 and/or output via the second electric machine 122 in a parallel hybrid drive together with a mechanical output power of the internal combustion engine 100.

When the internal combustion engine 100 is used in a vehicle, the excess energy of the exhaust-gas turbine 108 can be output to a drive train of the vehicle. The internal combustion engine 100 in the narrower sense, i.e. the combustion motor without the contribution of the second electric machine 122, is for example the main drive of the vehicle.

In the first power range, the electric machine 112 is at most operated as a motor. Preferably, in the first power range, the control unit 114 effects supercharging, independent of the existing exhaust-gas pressure, by controlling the operation of the electric machine 112 as a motor.

In the second power range, the electric machine 112 is operated at least at times as a generator. The control of the operation of the electric machine 112 can differentiate in the second power range of the internal combustion engine 100 between a first subrange and a second subrange, which corresponds to lower levels of power of the internal combustion engine 100. In the first subrange, the electric power converted by the generator increases with increasing power of the internal combustion engine 100. In the second subrange, the generator power of the electric machine 112 is limited to a maximum power during operation as a generator. A further increase in the exhaust-gas pressure is prevented by a wastegate 136 or optionally by opening a turbine adjustment geometry of the exhaust-gas turbine 108.

Figure 2:
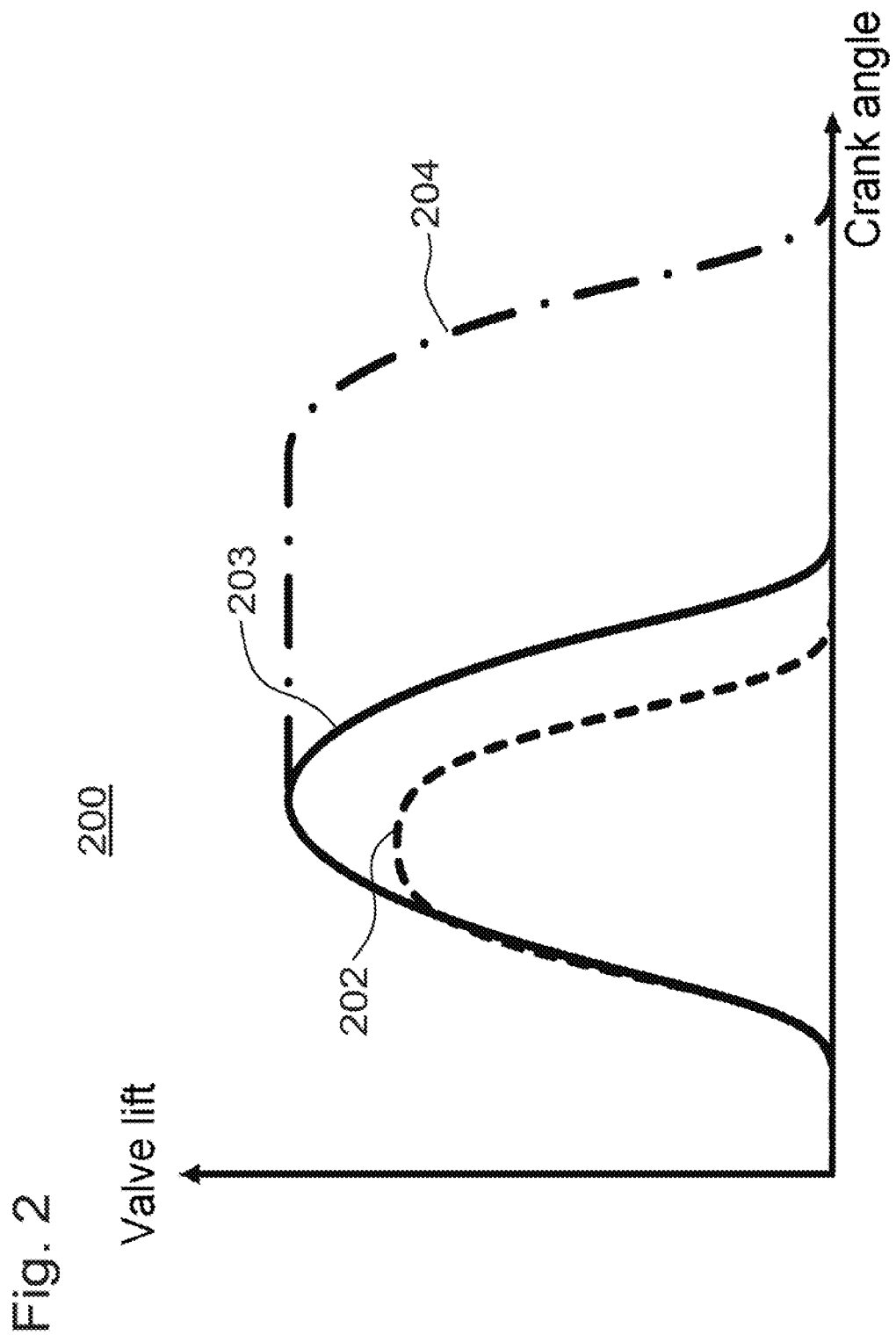
FIG. 2 shows a schematic diagram of the valve closing times according to different exemplary embodiments.

FIG. 2 shows a schematic diagram 200 of Miller and Atkinson closing times according to different embodiment variants 202 and 204 of the valve controller 102. An angular position of the crankshaft 120 is plotted on the horizontal axis. A valve lift effected by the cam 118 is plotted on the vertical axis.

The inlet system of the internal combustion engine 100 has fixed control timing for closing (closing time for short) of the inlet valves 104 in the intake stroke, i.e. invariable closing times. The diagram 200 also shows the comparative example 203 of a conventional filling-optimized design of the closing time. Compared with the filling-optimized comparative example 203, the closing time appears as an earlier closing point of an inlet stroke curve with Miller closing times in the embodiment variant 202 or as a later closing point of an inlet stroke curve with Atkinson closing times in the embodiment variant 204.

The exhaust-gas turbocharger 106 comprises the exhaust-gas turbine 108 and the compressor 110 and is coupled to the electric machine 112. The compressed charge air passes via a charge-air cooler 126 to the inlet system. The control unit 114 processes (inter alia) the signal from a pressure sensor 128 in the outlet manifold 130 upstream of the turbine 108 and/or from a pressure sensor 132 in the charge-air pipe 134 (preferably downstream of the charge-air cooler 126). Alternatively or additionally to the pressure sensor 128, sensors for determining the combustion air ratio can be arranged in the exhaust-gas manifold 130 (or at some other location), the signals from said sensors being picked up by the control unit 114.

If the measured pressure, the measured combustion air ratio or a value derived from the signals exceeds a predefined maximum value or setpoint value (predefined for example via a characteristic map with respect to the operating state of the internal combustion engine 100), the control unit 114 sends a signal for operation as a generator to the electric machine 112, which, as a generator, brakes the rotor of the exhaust-gas turbocharger 106 until the measured or derived value drops below the maximum value or assumes the setpoint value.

The current generated in this way is fed to the electrical energy store 124 or directly supplies the electric motor 122 connected to the drive train.

Figure 3:
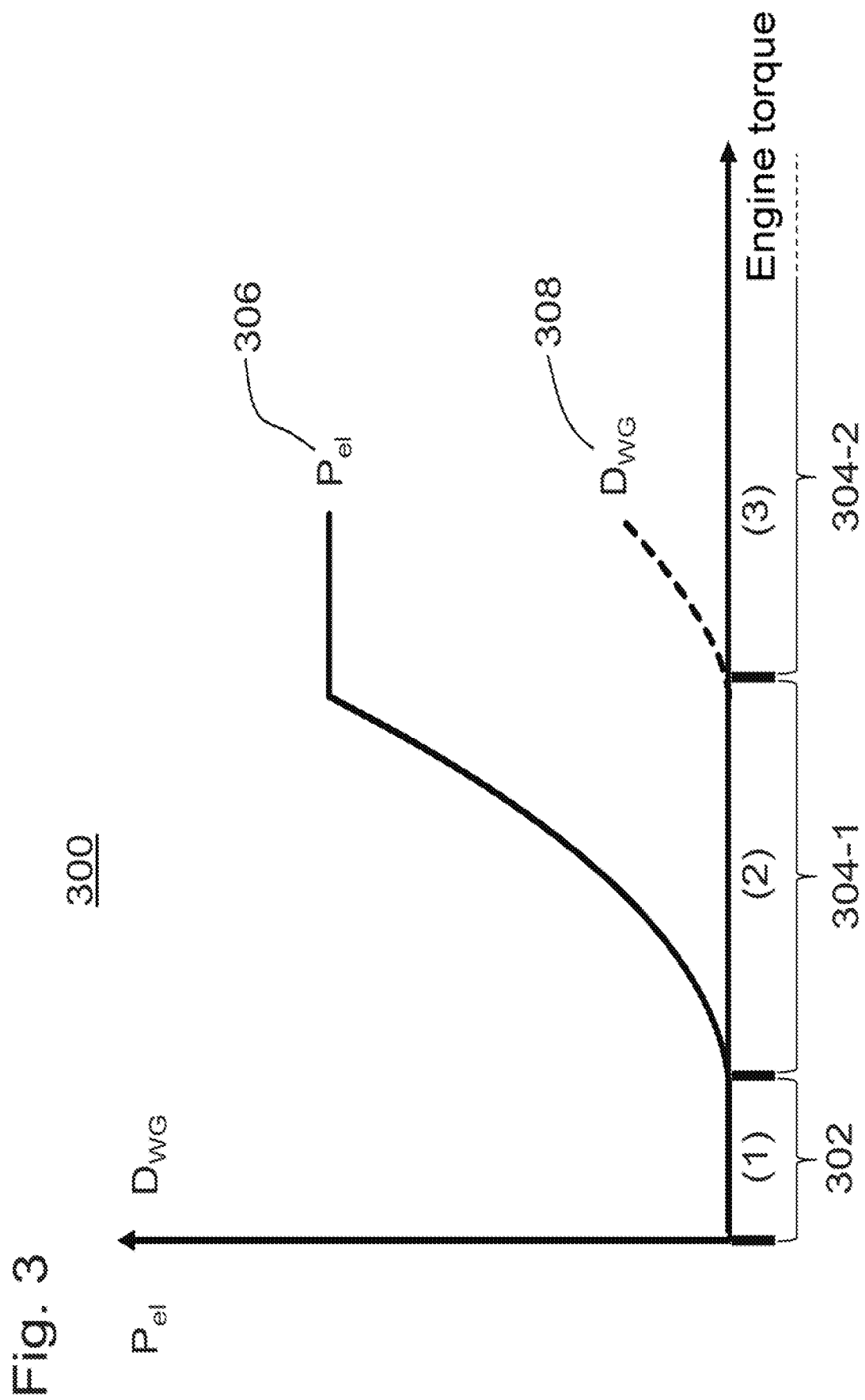
FIG. 3 shows a schematic diagram with different power ranges of the internal combustion engine according to an implementation that is combinable with each exemplary embodiment.

FIG. 3 shows a schematic diagram 300 of different operating modes in different load ranges. The load ranges are plotted on the horizontal axis of the diagram 300, for example as torque of the internal combustion engine 100. In order to keep the number of parameters for distinguishing the load ranges clear, the curve in FIG. 3 can represent the basic behaviour of the control unit 114 at a (for example typical or average) engine speed. In this regard, for the sake of clarity of illustration, and without limiting the technical teaching, the terms load, torque and power will no longer be differentiated here. A person skilled in the art can readily differentiate further between different operating modes by means of a higher-dimensional characteristic map (for example as a function of torque and engine speed). The specific values of such a characteristic map can change for different engine speeds.

In the first load range 302, the characteristic-map setpoint values for the pressure and/or the combustion air ratio are not yet reached, and therefore no braking by generator takes place. This does not take place until the second load range, wherein, in the lower subrange 304 of the second load range, the electrical power 306 increases with increasing torque up to a predetermined maximum value. Once this has been reached, the wastegate 136 (the opening cross section 308 of which is shown schematically in the diagram 300) or an adjustable turbine geometry opens in the upper subrange 304-2 of the second load range, in order not to allow the generated electrical power 306 to increase above the maximum value before the maximum torque is reached.

For a person skilled in the art, advantages of the internal combustion engine are apparent, in particular on the basis of the present exemplary embodiment. Thus, without complex variable valve controllers, the advantages of the Miller or Atkinson closing times are realizable, in particular as regards the reduced pressure load at very high specific levels of power. The described technology allows these closing times without a complicated cam adjustment system, as is otherwise required on account of the more unfavourable behaviour in partial-load operation and the lower dynamics.

A further advantage of the Miller or Atkinson closing times that are achievable by means of the technology is a reduction in nitrogen oxide emissions. This effect is comparable with moderately implemented exhaust-gas recirculation (EGR), which can be dispensed with in this case. The omission of a variable valve drive and the EGR section results in much less structural complexity of the internal combustion engine.

Furthermore, as a result of the omission of the EGR, the temperatures downstream of the turbine, or upstream of the inlet into an exhaust-gas aftertreatment (EGA), can increase. Thus, it is possible for the action of the EGA to be improved in particular at low mean pressures. Alternatively or in combination therewith, it is possible to achieve a reduction in the specific fuel consumption in parts of the operating range, for example given good efficiencies of the electrical and supercharging components. The improved action of the EGA can also contribute towards this via higher untreated nitrogen oxide emissions, for example since the improved action of the EGA allows higher untreated nitrogen oxide emissions. These occur for example when the start of injection is shifted to earlier times, this being associated normally with an improved efficiency of the high-pressure process. The technology can thus resolve a trade-off that usually exists (either less untreated nitrogen oxide emissions or lower fuel consumption).

Although the disclosure has been described with reference to exemplary embodiments, it is obvious to a person skilled in the art that various changes can be made and equivalents can be used as a replacement. Furthermore, many modifications can be made in order to adapt a particular application of the internal combustion engine or a particular material to the teaching of the disclosure. Therefore, the disclosure is not limited to the disclosed exemplary embodiments.

LIST OF REFERENCE SIGNS

100 Internal combustion engine
102 Valve controller of the internal combustion engine
104 Inlet valves of the internal combustion engine
106 Exhaust-gas turbocharger of the internal combustion engine
108 Turbine of the electrified exhaust-gas turbocharger
110 Compressor of the electrified exhaust-gas turbocharger
112 Electric machine of the electrified exhaust-gas turbocharger
114 Control unit
116 Camshaft
118 Cam
120 Crankshaft of the internal combustion engine
122 Electric machine at the crankshaft
124 Electrical energy store
126 Charge-air cooler
128 Exhaust-gas pressure sensor
130 Exhaust-gas manifold
132 Charge-air pressure sensor
134 Charge-air pipe
136 Wastegate
200 Closing-times diagram
202 Miller closing times
203 Comparative example
204 Atkinson closing times
300 Operatin-modes diagram
302 First load range
304-1 Lower subrange of the second load range
304-2 Upper subrange of the second load range
306 Output power of the exhaust-gas turbocharger
308 Opening cross section of the wastegate

I claim:

1. An internal combustion engine comprising:
   a valve controller which is configured to close inlet valves of the internal combustion engine at Miller or Atkinson closing times, wherein the closing times of the valve controller are invariable;
   an electrified exhaust-gas turbocharger having an electric machine which is operable selectively as a motor or generator; and
   a control unit which is configured to operate the electric machine of the electrified exhaust-gas turbocharger as a motor in a first load range of the internal combustion engine and to operate same as a generator in a second load range which corresponds to greater loads of the internal combustion engine than the first load range.

2. The internal combustion engine according to claim 1, wherein the control unit is configured to not operate the electric machine of the electrified exhaust-gas turbocharger as a generator in the first load range and/or to operate the electric machine of the electrified exhaust-gas turbocharger as a generator only in the second load range.

3. The internal combustion engine according to claim 1, wherein the exhaust-gas turbocharger comprises a compressor and a turbine driving the compressor, which are designed to generate a charge pressure that compensates a charging volume, reduced with respect to the displacement on account of the closing times, in the first load range of the internal combustion engine.

4. The internal combustion engine according to claim 3, wherein a turbine cross section of the turbine is dimensioned or a turbine geometry of the turbine is shaped such that the exhaust-gas turbocharger compensates the charging volume, reduced by the closing times, by the charge pressure in the first load range.

5. The internal combustion engine according to claim 3, wherein the turbine cross section and/or the turbine geometry is invariable.

6. The internal combustion engine according to claim 4, wherein the control unit is configured to convert a mechanical power of the turbine, which goes beyond the power required by the compressor for compensation, by means of the electric machine operated as a generator, in the second load range.

7. The internal combustion engine according to claim 3, wherein the electric machine of the exhaust-gas turbocharger is rigidly coupled to the turbine of the exhaust-gas turbocharger.

8. The internal combustion engine according to claim 1, wherein the valve controller comprises a camshaft driven by a crankshaft of the internal combustion engine, said camshaft determining the closing times.

9. The internal combustion engine according to claim 1, wherein the internal combustion engine also comprises a rechargeable energy store which is connected or connectable to the electric machine of electrified exhaust-gas turbocharger in order to store the electrical energy output during operation as a generator.

10. The internal combustion engine according to claim 1, wherein the internal combustion engine also comprises a second electric machine, which is configured as a power machine in order to convert electrical energy output by the electrified exhaust-gas turbocharger in the second power range.

11. The internal combustion engine according to claim 10, wherein the second electric machine is connected or connectable to the electrical energy store for power supply.

12. The internal combustion engine according to claim 10, wherein the control unit is also configured to connect the second electric machine to the electric machine, operated as a generator, of the electrified exhaust-gas turbocharger for power supply by said electric machine.

13. The internal combustion engine according to claim 1, wherein a wastegate is arranged in the exhaust-gas flow of the internal combustion engine, and the control unit is also configured to open the wastegate in a part of the second load range which corresponds to high loads within the second load range.

14. A motor vehicle, comprising:
an internal combustion engine;
a valve controller which is configured to close inlet valves of the internal combustion engine at Miller or Atkinson closing times, wherein the closing times of the valve controller are invariable;
an electrified exhaust-gas turbocharger having an electric machine which is operable selectively as a motor or generator; and
a control unit which is configured to operate the electric machine of the electrified exhaust-gas turbocharger as a motor in a first load range of the internal combustion engine and to operate same as a generator in a second load range which corresponds to greater loads of the internal combustion engine than the first load range.

15. The motor vehicle of claim 14, wherein the motor vehicle is a commercial vehicle.

\* \* \* \* \*